(12) United States Patent
Sasaki et al.

(10) Patent No.: US 9,957,371 B2
(45) Date of Patent: May 1, 2018

(54) NANOPARTICLE-CONTAINING POLYMER NANOWIRE AND METHOD FOR PRODUCING THE SAME

(71) Applicant: NATIONAL INSTITUTE FOR MATERIALS SCIENCE, Ibaraki (JP)

(72) Inventors: Michiko Sasaki, Ibaraki (JP); Masahiro Goto, Ibaraki (JP); Akira Kasahara, Ibaraki (JP); Toyohiro Chikyo, Ibaraki (JP); Masahiro Tosa, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 458 days.

(21) Appl. No.: 14/364,808

(22) PCT Filed: Dec. 13, 2012

(86) PCT No.: PCT/JP2012/082421
§ 371 (c)(1),
(2) Date: Jun. 12, 2014

(87) PCT Pub. No.: WO2016/089201
PCT Pub. Date: Jun. 20, 2016

(65) Prior Publication Data
US 2015/0104662 A1    Apr. 16, 2015

(30) Foreign Application Priority Data

Dec. 14, 2011    (JP) .................................. 2011-273538

(51) Int. Cl.
*C08K 5/01*    (2006.01)
*C08K 3/22*    (2006.01)
(Continued)

(52) U.S. Cl.
CPC ................ *C08K 3/22* (2013.01); *B82Y 30/00* (2013.01); *C08K 5/01* (2013.01); *B82Y 40/00* (2013.01);
(Continued)

(58) Field of Classification Search
None
See application file for complete search history.

(56) References Cited

U.S. PATENT DOCUMENTS

2003/0217928 A1* 11/2003 Lin ........................ B82Y 30/00
205/109

FOREIGN PATENT DOCUMENTS

JP    2009-179922    8/2009
JP    2010-76044    4/2010

OTHER PUBLICATIONS

Erk et al., Formation of gold nanoparticles in polymeric nanowires by low-temperature thermolysis of gold mesitylene, Nov. 8, 2011, J. Mater. Chem., 2012, 22, pp. 684-690.*
(Continued)

*Primary Examiner* — Elizabeth A Robinson
(74) *Attorney, Agent, or Firm* — Wenderoth, Lind & Ponack, L.L.P.

(57) ABSTRACT

Provided is a polymer nanowire which contains nanoparticles so as to have new functionalities. A thin film is formed on a substrate and includes functional nanoparticles and polymers, and further includes a photosensitive pigment as required. The thin film is irradiated with a pulsed laser. This causes a polymer nanowire containing the functional nanoparticles to grow from a surface of the thin film.

11 Claims, 4 Drawing Sheets

(51) Int. Cl.
*B82Y 30/00* (2011.01)
*B82Y 40/00* (2011.01)
*C08K 3/00* (2018.01)
*C08K 5/00* (2006.01)

(52) U.S. Cl.
CPC .......... *C08K 3/0033* (2013.01); *C08K 5/0025* (2013.01); *C08K 2003/2265* (2013.01); *C08K 2003/2268* (2013.01); *C08K 2201/01* (2013.01); *C08L 2205/16* (2013.01); *Y10T 428/298* (2015.01); *Y10T 428/31938* (2015.04)

(56) References Cited

OTHER PUBLICATIONS

Balasubramanian et al., Dekker Encyclopedia of Nanoscience and Nanotechnology—Chapter 377, Titania Coatings on Stainless Steel), 2009, CRC Press, Second Edition, pp. 4348-4355.*

International Search Report dated Jan. 15, 2013 in International (PCT) Application No. PCT/JP2012/082421.

M. Goto et al., "Synthesis of Polymer Nanowires by Pulsed Laser Irradiation", Applied Physics Express, No. 2, pp. 065503-1-065503-2, 2009.

M. Goto et al., "Kobunshi Nanowire", Kogyo Zairyo, vol. 58, No. 1, pp. 30-31, Jan. 2010 (with English translation).

* cited by examiner

NANOPARTICLE-CONTAINING POLYMER NANOWIRE AND METHOD FOR PRODUCING THE SAME

TECHNICAL FIELD

The present invention relates to a polymer nanowire containing nanoparticles such as functional nanoparticles, and a method for producing the same.

BACKGROUND ART

Unlike nanowires including inorganic materials, polymer nanowires have high flexibility and are optically transparent. Due to those properties, the polymer nanowires are expected to be used as nanodevices such as a sensor, a light-emitting element, an optical switching element, an electronic device, a memory, a thermoelectric conversion device, a micromachine, a friction device, and a drive mechanism. However, there are few studies and developed applications thereof, because the polymer nanowires themselves are not easily produced.

One of the most typical methods for producing the polymer nanowires includes using, as a template, a porous alumina substrate having a plurality of pores in submicron-level, pouring melted polymer materials into those pores, and after solidifying the polymer materials, melting an alumina material to precipitate a polymer nanowire.

With this method, a large amount of polymer nanowires can be produced. However, a diameter of the produced nanowires is limited to about 300 nm at thinnest. Accordingly, it is difficult to apply the nanowires to nanodevices which require a thin nanowire having a diameter of several tens of nanometers or less, and have been expected to have a quantum effect.

Moreover, since this method requires processing to etch the template by an etching process and to extract the polymer nanowire, there have been problems such as a restriction of the polymer materials to be used and the fact that the nanowire can be easily damaged.

To solve these problems, the present inventors have discovered a phenomenon of forming an additive-free polymer nanowire by pulsed laser irradiation (Non-Patent Literature 1), and have devised a polymer nanowire based thereon and a method for producing the same (Patent Literature 1).

Patent Literature 1: JP 2010-076044 A
Non-Patent Literature 1: Masahiro Goto, Akira Kasahara, Masahiro Tosa, "Synthesis of Polymer Nanowires by Pulsed Laser Irradiation," Appl Phys. Express.

SUMMARY OF INVENTION

Technical Problem

However, in application of the polymer nanowire to various nanodevices, in many cases, such an additive-free nanowire is inadequate and doping other nanomaterials is required in order to express required function and characteristics. However, Patent Literature 1 stops short of doping required functional nanomaterials and adding novel functionalities thereto.

An object of the present invention is to provide a polymer nanowire containing nanoparticles such as functional nanoparticles.

Solution to Problem

According to an aspect of the present invention, there is provided a polymer nanowire containing nanoparticles.

Herein, a diameter of the nanowire may be less than 500 nm.

A diameter of the nanowire may be 0.2 nm or more.
A length of the nanowire may be 100 nm or more.
A diameter of the nanoparticles may be 0.1 nm or more and less than 300 nm.

Polymers of the polymer nanowire may include at least one type of polymers selected from the group consisting of a methacrylate polymer, a polyvinyl polymer, a polythiophene polymer, a polyacetylene polymer, a polyaniline polymer, and a polypyrrole polymer.

The nanoparticles may be magnetic bodies and may be driven by applying a magnetic field thereto.

According to another aspect of the present invention, there is provided a thin film/polymer nanowire complex which includes a thin film including polymers containing nanoparticles, and the polymer nanowire containing the nanoparticles and extended from the thin film.

According to still another aspect of the present invention, there is provided a method for producing a nanoparticle-containing polymer nanowire. The method includes irradiating, with a laser, a thin film including at least polymers and nanoparticles, and growing a polymer nanowire containing the nanoparticles from a position in the thin film which has been irradiated with the laser.

Herein, the thin film may further include a light-absorbing material.

The light-absorbing material may be a photosensitive pigment.

The laser may be a pulsed laser.

The polymer nanowire may grow from a surface in the thin film opposite to a surface irradiated with the laser.

The thin film may include a single layer including both the polymers and the nanoparticles.

The thin film may include at least one layer including the polymers and at least one layer including the nanoparticles.

Advantageous Effects of Invention

According to the present invention, the polymer nanowire obtains novel characteristics based on properties not only of the polymers in a base material but also of the contained nanoparticles. Therefore, the present invention can provide a micromachine such as a minute actuator, and a core component such as a sensor, but is not restricted thereto.

DESCRIPTION OF EMBODIMENTS

The present invention provides a polymer nanowire containing nanoparticles such as functional nanoparticles by improving the method for producing a polymer nanowire described in Patent Literature 1.

More specifically, according to the method for producing a nanoparticle-containing polymer nanowire of the present invention, first, a thin film which includes polymers, nanoparticles, and a photosensitive pigment is prepared. The thin film can be formed by employing various methods such as spin coating.

Figure 1:
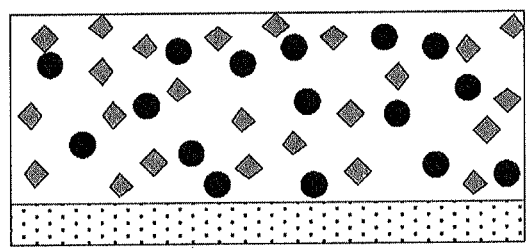
FIGS. 1(a) to 1(d) are views illustrating various examples of a layer composition of a thin film which causes a nanoparticle-containing polymer nanowire of the present invention to grow.
Figure 1:
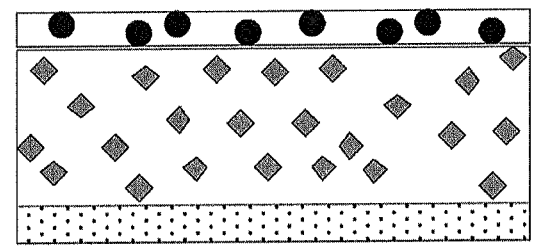
Figure 1:
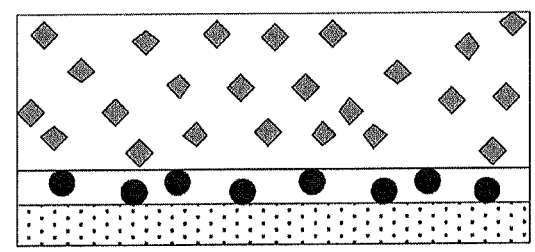
Figure 1:
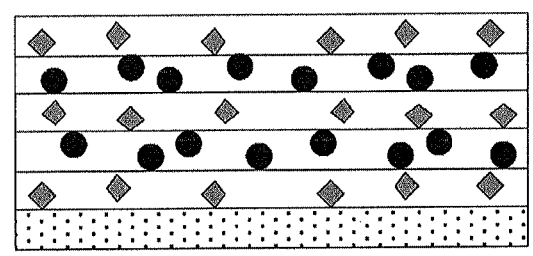

In the thin film, nanoparticles may be dispersed uniformly into the polymers (single-layer structure). This case is illustrated in FIG. 1(a). In the same drawing, an underneath layer with plenty of fine dots is a substrate made of glass and the like, and a layer placed thereon is the thin film. Circles in the thin film represent the polymers, while squares represent the nanoparticles. The notations in FIGS. 1(b) to 1(d) are the same as in FIG. 1(a).

In cases where the nanoparticles are not easily dispersed into the polymers, as shown in FIG. 1(c), a thin film including all required components may be produced by, instead of dispersion, forming a multi-layer structure in which a polymer layer is formed, and then the nanoparticles are supported thereon to place a nanoparticle layer thereon.

As shown in FIG. 1(b), positions of the nanoparticle layer and the polymer layer may be inverted upside down.

A thin film with such a multi-layer structure may have three or more layers by repeating the above-described composition (bilayer structure of the polymer and nanoparticle layers). An example thereof is described in FIG. 1(d).

As for a method for supporting the nanoparticles, liquid in which the nanoparticles have been dispersed may be sprayed on the formed polymer layer, or other various methods such as spin coating may be employed.

In cases where such a multi-layer film structure is used, usually, a light-absorbing material is included in the polymer layer. This is because there are many cases where the nanoparticles do not dissolve in a solvent. However, it is expected that a doping amount of the nanoparticles is increased as long, as the nanoparticle layer includes a light-absorbing material. Accordingly, depending on various conditions, the light-absorbing material may be put into any one of those layers or may be put into both layers.

A thickness of the thin film differs depending on a length and fineness of a required nanoparticle-containing polymer nanowire. For example, as long as a short nanoparticle-containing polymer nanowire is sufficient, a thin film is adequate. A required thickness of the thin film greatly differs depending on a specific polymer, nanoparticle, and light-absorbing material to be used, or depending on emittance and irradiation time of a pulsed laser. Therefore, a thickness range applicable to all these conditions cannot be generally determined.

Next, the thin film provided as described above is irradiated with a pulsed laser. Irradiation conditions, such as intensity of the laser with which the film is irradiated, differ depending on a polymer, nanoparticle, and/or photosensitive pigment to be used as a raw material. By optimizing the irradiation conditions corresponding to a subject to be irradiated, a polymer nanowire grows with nanoparticles of a thin film from a laser-irradiated position on the surface of the thin film. A wavelength of the laser to be used is preferably selected according to its absorption wavelength, so that the laser is efficiently absorbed into the light-absorbing material included in the thin film.

Irradiation conditions which should be optimized include an irradiation region in addition to intensity of the laser. The irradiation region herein specifically represents a region to be irradiated, which is in a thickness direction of the film. The irradiation region represents a region which becomes a focus to be irradiated with the laser, for example, a region near an interface between a substrate and the thin film, a region near a center in the thickness direction of the film, or a region near the surface where the nanowire grows. When a thin film has a multi-layer structure, the irradiation region represents whether a polymer layer or a nanoparticle layer becomes a focus of irradiation. When a thin film has a structure obtained by repeating the same layer, the irradiation region represents which layer from the top becomes a focus of irradiation. Further, the irradiation conditions are also influenced by the above-mentioned structure of the thin film (single-layer film/multi-layer film).

According to the method for producing a nanoparticle-containing polymer nanowire of the present invention, it is possible to produce a nanowire preferably having a diameter of 0.2 nm or more and less than 500 nm, more preferably 2 nm or more and less than 300 nm, and preferably having a length of 100 nm or more, more preferably 100 nm or more and less than 800 μm. A cross-sectional shape in a radial direction may be a round shape or other various shapes depending on the raw material to be used and on various producing conditions. Herein, a diameter of the nanowire can be measured from an observation image obtained by an electron microscope. When a cross-sectional shape of the nanowire is a round shape, the diameter of the nanowire is a diameter of a circle. When the cross-sectional shape of the nanowire is some other shape, the diameter of the nanowire is the longest distance between cross-sectional rims. A length of the nanowire can be measured from an observation image obtained by an electron microscope.

In the above production method, various materials can be used as a polymer. Preferred examples of a usable material include a methacrylate polymer such as PMMA, PBMA, or PEMA, a polyvinyl polymer such as polystyrene, a polythiophene polymer, a polyacetylene polymer, a polyaniline polymer, and a polypyrrole polymer.

As for a nanoparticle, the following Example exemplifies an iron oxide nanoparticle, but it is clear that a polymer nanowire including other nanoparticle materials can be produced as well. In Example, a nanowire contains iron oxide nanoparticles so as to be granted magnetic functionality. Of course, however, functionality granted to a nanowire containing nanoparticles is not restricted to magnetic one. For example, without any limitation, doping nanomaterials such as CdTe changes an optical characteristic (fluorescence) and the like.

Types of functional materials for a nanoparticle include the following.

Functional materials for granting magnetic characteristics include magnetic metals such as Fe, Ni, Co, and Mn, various magnetic bodies such as oxides thereof, and metallic complex ferromagnetic bodies.

Functional materials for granting optical characteristics include quantum dots such as CdTe, ZnTe, CdS, ZnS, CdSe, and ZnSe, and all organic molecules, for example, phthalocyanine (Pc), a phthalocyanine compound such as PcZn, PcNi, and PcH$_2$, porphyrin, tetraphenylporphyrin, a porphyrin compound, a tetraphenylporphyrin compound, anthracene, an anthracene compound, pyrene, a pyrene compound, rubrene, coumarin, a coumarin compound, fluorescein, rhodamine, and a rhodamine compound.

Functional materials for granting electric characteristics include all materials having conductivity such as metals.

Functional materials for granting radiative characteristics include uranium, potassium, radium, radon, plutonium, cesium, cobalt, iodine, thorium, and carbon.

Further, in Example, substantially spherical nanoparticles having a small aspect ratio are used as a nanoparticle, but the present invention is not restricted thereto. It goes without saying that nanoparticles in various shapes such as linear and plate-like shape may be used as well. A size of nanoparticles, though depending on a diameter of a nanowire, is preferably within the range of 0.1 nm or more and less than 300 nm, and more preferably within the range of 1 nm or more and less than 300 nm.

In preparing the above-mentioned thin film, a photosensitive pigment is used. In practical use, however, any material other than a pigment can be used as long as the material absorbs light (light-absorbing material). Many polymer materials are transparent and, therefore, absorb only a little amount of laser beam as they are. Accordingly, instead of a polymer material, a light-absorbing material such as a pigment is photoexcited and the energy caused thereby is transmitted to the polymers so that the polymers are thermally hardened. Further, in cases where nanoparticles also function as a light-absorbing material, a light-absorbing material such as a photosensitive pigment may not be used. In cases where a photosensitive pigment is used, preferred pigments include one having a stable property (resistant to photolysis) by irradiation with light, for example, coumarin, pyrene, perylene, anthracene, porphyrin, and phthalocyanine.

The above-mentioned production process can be carried out in the atmosphere unless any raw material to be used is adversely affected by atmospheric components.

Since the production method of the present invention is a simple production process using a laser, instead of irradiating one point and growing a nanowire only at that point, it is possible to simultaneously irradiate a broad area with light by using a large-area scanning method with a laser or a fly-eye lens. By simultaneously growing a plurality of the nanoparticle-containing polymer nanowires of the present invention over a broad area on the thin film, mass production thereof can be easily put into practice. By selecting a plurality of desired positions on the thin film, and by selectively growing the nanoparticle-containing polymer nanowires of the present invention at the desired positions, an integrated device exerting complicated functions can also be provided. For example, although it should not be restricted to the following, in cases where such an integrated device is used, instead of cutting only the grown nanowires and using the same, a thin film from which the nanowires remain grown or a complex including a substrate on which the thin film is placed can be used as a component of a desired device.

In the above description, a pulsed laser is used. However, a CW laser can also be used, for example, in cases where nanowires grow across a wide area by scanning with the laser. When a specific point is irradiated with the CW laser, irradiation time becomes long at that point so that polymers at that point become resistant to hardening. However, scanning with a galvano scanner at high speed extremely shortens the time of irradiating each position to be irradiated with the laser, in a similar manner to the case where a pulsed laser is used. As a result, the polymer nanowires of the present invention are produced at those positions. In this case, it is clear that a laser with high intensity is required.

The production method of the present invention and the nanowire produced thereby involve the polymer materials and contained nanoparticles which are selected from an extremely wide range. Therefore, by appropriately selecting the polymer materials and nanoparticles, a polymer nanowire exerting functionality required in various application fields can be designed and produced.

EXAMPLE

Hereinafter, the present invention will be described in more detail with reference to Example, but the present invention is not restricted to the following Example.

Figure 2:
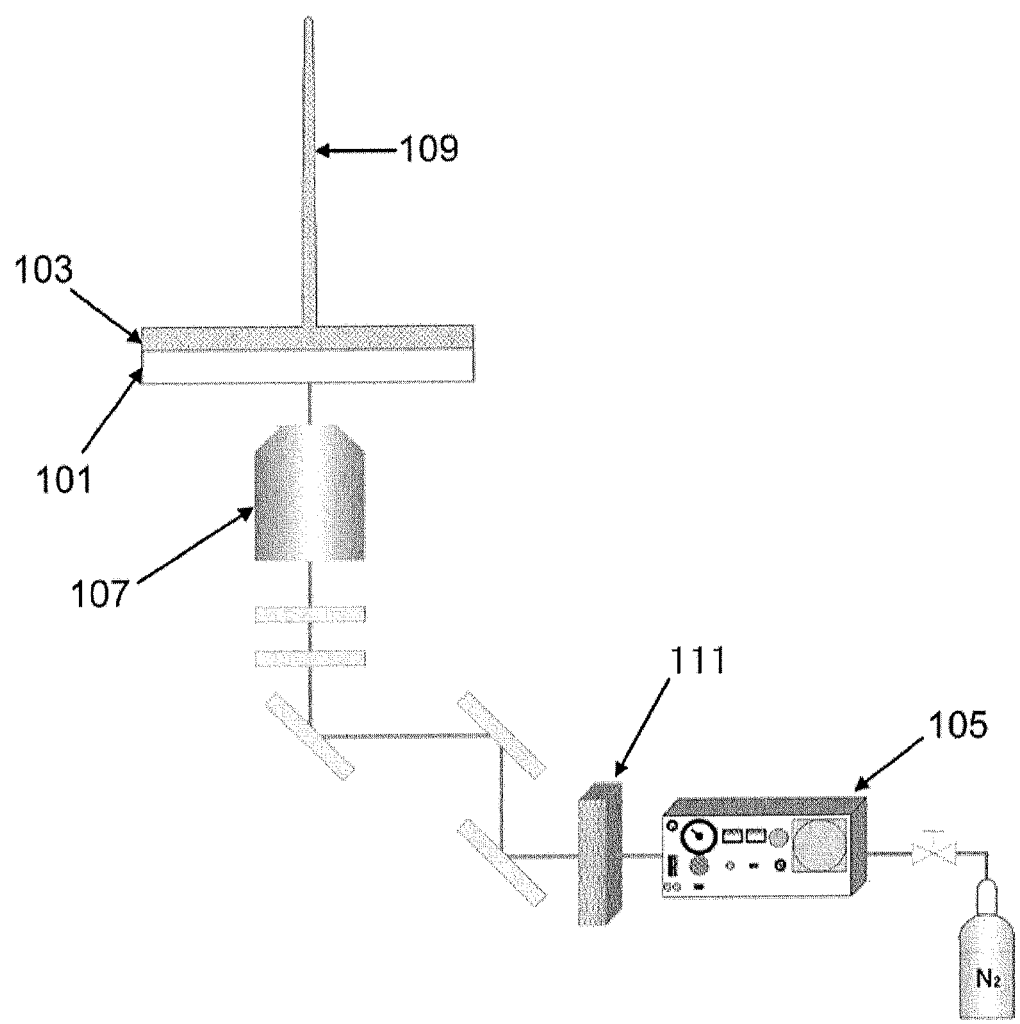
FIG. 2 is a view illustrating a configuration of a device employed for a production method in an Example of the present invention.

FIG. 2 illustrates a conceptual configuration of a device used in producing a nanoparticle-containing polymer nanowire in an Example of the present invention.

As a substrate 101, polysilicate glass having a thickness of 170 μm was used. As a polymer, polystyrene (PS) was used. As a nanoparticle, an iron oxide nanoparticle having a particle size of about 20 nm was used (the nanoparticle used herein is mixed with an iron oxide having several valences, but, hereinafter described as FeO). As a light-absorbing material, Coumarin 6 (C6) is used.

First, PS and C6 were put into chlorobenzene or xylene and stirred for 8 hours or more. After dissolving the mixture, FeO was added thereto and a polystyrene (nanoFeO-PS) solution, in which iron oxide nanoparticles were dispersed, was prepared.

By spin coating, the substrate 101 was covered with the nanoFeO-PS solution which had been prepared as above. After coating, the substrate was dried for 8 hours or more in the atmosphere to produce a nanoFeO-PS thin film 103.

One pulse of a pulsed laser which had a wavelength of 440 nm and a pulse width of 900 ps, and which was generated from a laser generator 105 was introduced to a 20-power objective lens 107 through a pigment 111 and an optical system, and by focusing light with this objective lens 107 on the nanoFeO-PS thin film 103, the thin film 103 was irradiated with the laser from the rear side, that is, from the side of the substrate 101. By irradiating with the laser under required conditions determined depending on a raw material to be used, a nanoparticle-containing polymer nanowire 109 added with FeO nanoparticles in PS grew in the vertical direction from the surface of the nanoFeO-PS thin film 103, that is, from the opposite side of the substrate 101.

Figure 3:
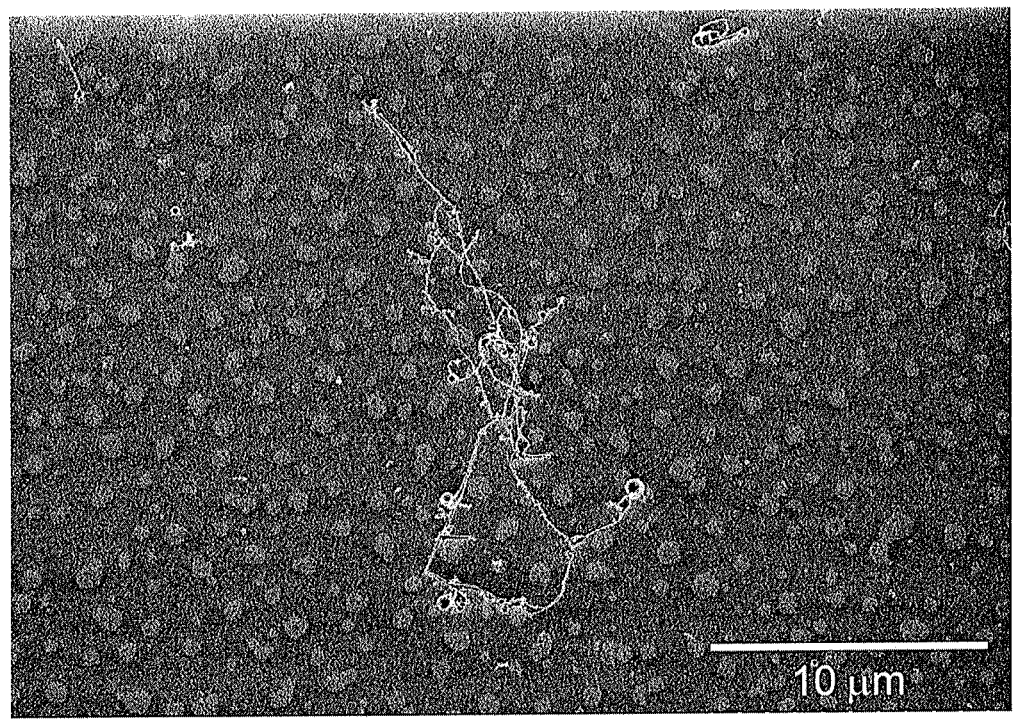
FIG. 3 is an electron microscope image of the whole nanoparticle-containing polymer nanowire of an Example of the present invention.

An electron microscope image of the whole nanoparticle-containing polymer nanowire produced as described above is shown in FIG. 3. From FIG. 3, it is clear that a polystyrene nanowire is produced, with iron oxide nanoparticles dispersed therein, and having a diameter of 25 nm and a length of about 20 μm.

Figure 4:
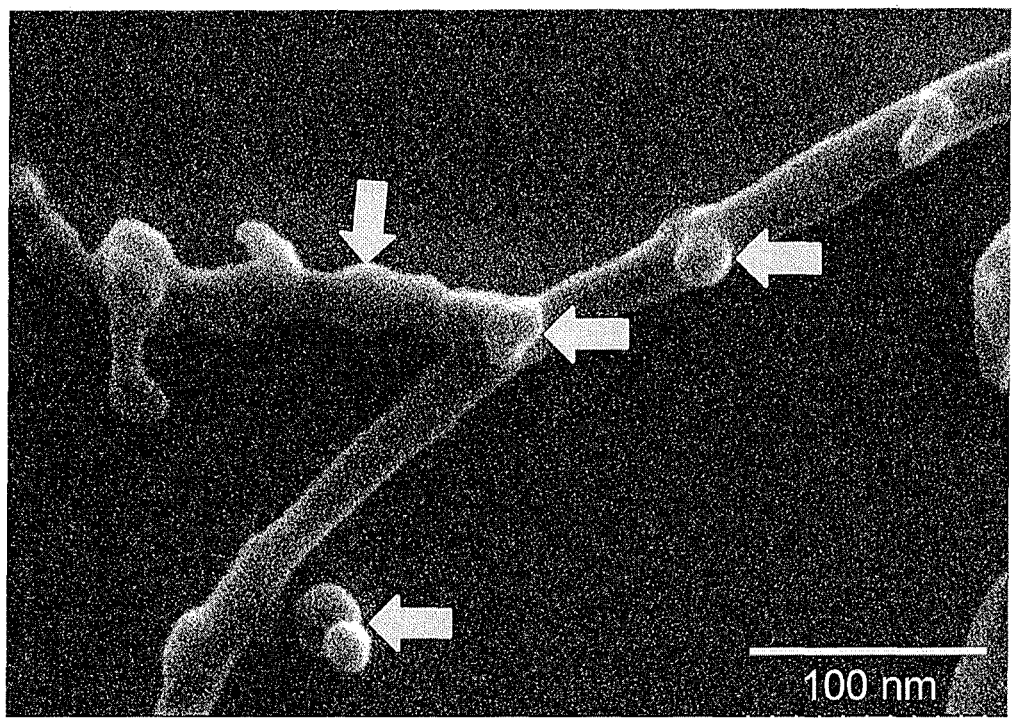
FIG. 4 is an enlarged electron microscope image showing details of the nanoparticle-containing polymer nanowire shown in FIG. 3.

An enlarged electron microscope image showing details of the nanowire is shown in FIG. 4. From FIG. 4, it is noted that there are iron oxide nanoparticles having a diameter of about 20 nm (indicated by arrows) throughout the polystyrene polymer nanowire. In the present Example, a thickness of the thin film 103 is changed within the range of 1 to 100 μm, and it is found that any thin film having a thickness within this range provides a nanoparticle-containing polymer nanowire.

In the present Example, by including iron oxide, which is a typical magnetic material, in the polymer nanowire, the polymer nanowire could be newly granted magnetic functionality. Since the nanowire is granted motional functionality by applying a magnetic field thereto, the nanowire can induce, for example, a movement like a biotic flagellum. Accordingly, it is expected that this nanowire is used, for example, as an extremely minute actuator of a drive source for a bio-micromachine which moves inside a blood vessel of a human body. Of course, it goes without saying that the polymer nanowire can be granted some other arbitrary functionality depending on selection of nanoparticles to be contained.

INDUSTRIAL APPLICABILITY

Since the polymer materials and nanoparticles used in the nanoparticle-containing polymer nanowire of the present invention are selected from an extremely wide range, by appropriately selecting polymer materials and nanoparticles, a polymer nanowire applicable to various application fields can be provided. Accordingly, the present invention is expected to be applied to a molecular device and a micromachine, which are used in many application fields.

REFERENCE SIGNS LIST

101: substrate
103: thin film
105: laser generator
107: objective lens
109: nanoparticle-containing polymer nanowire
111: pigment

The invention claimed is:

1. A thin film/polymer nanowire complex comprising:
a thin film that includes at least one polymer layer including a polymer and at least one nanoparticle layer including nanoparticles, wherein at least one of the polymer layer and the nanoparticle layer includes a photosensitive pigment selected from the group consisting of coumarin, pyrene, perylene, anthracene, porphyrin, and phthalocyanine; and
a polymer nanowire of the polymer containing a plurality of nanoparticles in a distributed manner along the length thereof, the nanoparticles contained in the polymer nanowire being the same type of the nanoparticles as in the thin film, and the polymer nanowire extended from the thin film;
wherein the polymer includes at least one type of polymer selected from the group consisting of a methacrylate polymer, a polyvinyl polymer, a polythiophene polymer, a polyacetylene polymer, a polyaniline polymer, and a polypyrrole polymer; and
wherein the nanoparticles are a functional material selected from the group consisting of magnetic material, material with optical properties, material with electrical properties, and radiative material.

2. The thin film/polymer nanowire complex according to claim 1, wherein the nanowire has a diameter of less than 500 nm.

3. The thin film/polymer nanowire complex according to claim 2, wherein the nanowire has a diameter of 0.2 nm or more.

4. The thin film/polymer nanowire complex according to claim 1, wherein the nanowire has a length of 100 nm or more.

5. The thin film/polymer nanowire complex according to claim 4, wherein the nanoparticle has a diameter of 0.1 nm or more and less than 300 nm.

6. The thin film/polymer nanowire complex according to claim 1, wherein the nanoparticle is a magnetic body and is driven by applying a magnetic field thereto.

7. The thin film/polymer nanowire complex according to claim 1, wherein the magnetic material is selected from the group consisting of Fe, Ni, Co, Mn, oxides of Fe, Ni, Co, or Mn, and metallic complex ferromagnetic bodies.

8. The thin film/polymer nanowire complex according to claim 1, wherein the material with optical properties is selected from the group consisting of quantum dots of CdTe, ZnTe, CdS, ZnS, CdSe, and ZnSe; phthalocyanine (Pc); PcZn; PcNi; PcH$_2$; porphyrin; a compound comprising porphyrin; tetraphenylporphyrin; a compound comprising tetraphenylporphyrin; anthracene; a compound comprising anthracene; pyrene; a compound comprising pyrene; rubrene; coumarin; a compound comprising coumarin; fluorescein; rhodamine; and a compound comprising rhodamine.

9. The thin film/polymer nanowire complex according to claim 1, wherein the material with electrical properties is a metal.

10. The thin film/polymer nanowire complex according to claim 1, wherein the radiative material is selected from the group consisting of uranium, potassium, radium, radon, plutonium, cesium, cobalt, iodine, thorium, and carbon.

11. The thin film/polymer nanowire complex according to claim 1, wherein the nanowire is formed by laser irradiation.

* * * * *